United States Patent [19]

Smith et al.

[11] Patent Number: 4,742,574

[45] Date of Patent: May 3, 1988

[54] TWO-WIRE 4-20 MA ELECTRONICS FOR A FIBER OPTIC VORTEX SHEDDING FLOWMETER

[75] Inventors: Jane E. Smith, Mentor, Ohio; Thomas B. DeWitt, Lexington Park, Md.

[73] Assignee: The Babcock & Wilcox Company, New Orleans, La.

[21] Appl. No.: 825,415

[22] Filed: Feb. 3, 1986

[51] Int. Cl.$^4$ .............................................. H04B 9/00

[52] U.S. Cl. ............................... 455/608; 250/214 A; 455/610; 455/612; 455/617

[58] Field of Search ............... 455/608, 610, 612, 617; 250/214 A

[56] References Cited

U.S. PATENT DOCUMENTS 4,628,197 12/1986 Thompson ...................... 250/214 R

*Primary Examiner*—Michael A. Masinick

*Assistant Examiner*—L. Van Beek

*Attorney, Agent, or Firm*—Vytas R. Matas; Robert J. Edwards

[57] ABSTRACT

A method and apparatus for processing optically generated signals to form a two-wire 4–20 mA signal comprises generating a control signal having pulses at a selected frequency to drive a light emitter which generates light pulses, transmitting the light pulses to a light detector over a transmission line having variable attenuation to form a sensor signal and amplifying the sensor signal in an operational amplifier. The variations and attentuations follow a process variable to be measured. To save power the operational amplifier has a low-current mode into which it is switched whenever no pulse is present in the sensor signal. The amplifier is switched into its high-current mode only when a pulse is present in the sensor signal. Switching is controlled by the control signal for the light emitter. Peaks in the signal from the operations amplifier are sampled and held and then subject to low pass filtering to remove the selected frequency componnent and leave a cyclic filtered signal. The operational amplifier also receives a signal to drive it toward ground using a feedback clamping signal which changes slowly with respect to the cyclic filter signal. The filter signal is used to trigger a multivibrator to form a pulse signal having pulses with fixed length and amplitude for each cycle of the filter. The pulse signal is then averaged with respect to its voltage and subjected to zero and span adjustments. The voltage signal is then converted to a two-line 4–20 mA current signal.

13 Claims, 5 Drawing Sheets

FIG. 2
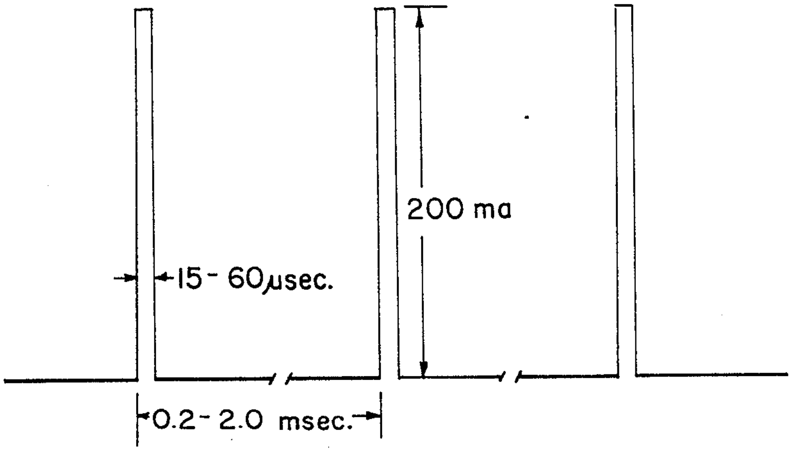
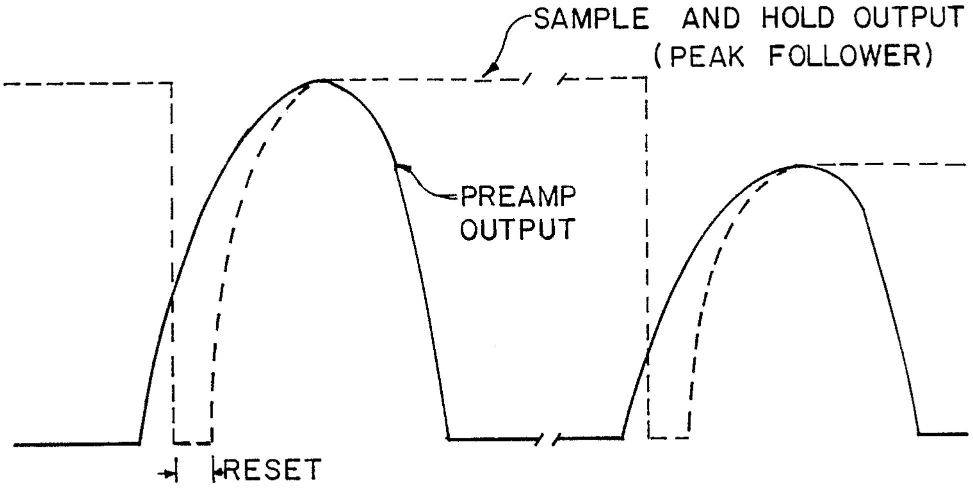
FIG. 3

FIG. 4
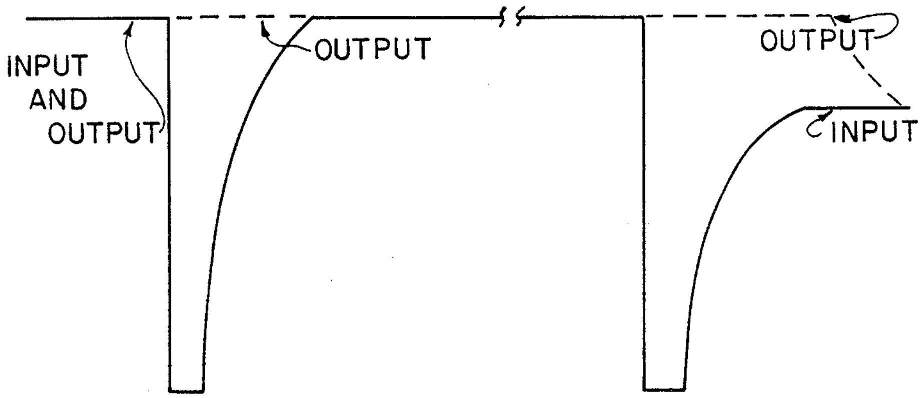
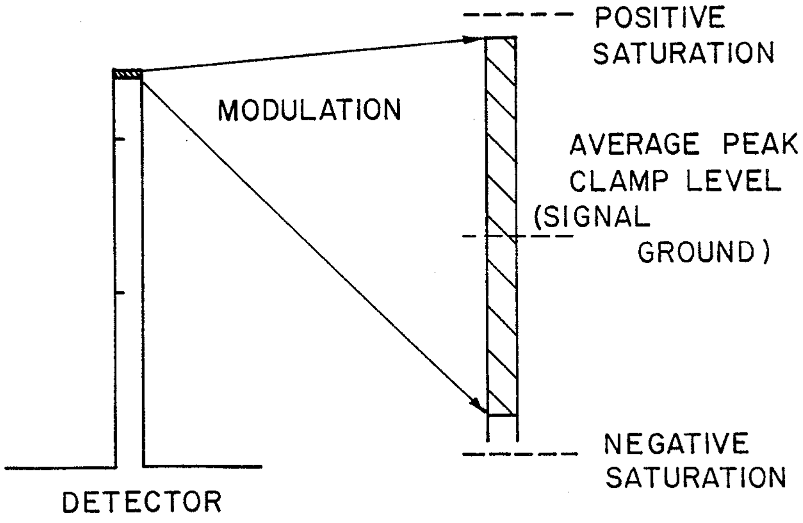
FIG. 5

TWO-WIRE 4-20 MA ELECTRONICS FOR A FIBER OPTIC VORTEX SHEDDING FLOWMETER

FIELD AND BACKGROUND OF THE INVENTION

The present invention relates in general to the electrical circuitry for sensors using fiber optics, and in particular to a new and useful method and arrangement for utilizing a fiber optic readout such as a microbend or other sensor, as a readout for a vortex shedding flowmeter which operates in a two-wire 4–20 mA format and which is capable of providing analog current outputs even for low flow rates and which overcomes power requirement restrictions existing in present fiber optic techniques.

A microbend fiber optic sensor unit can be used in a vortex shedding flowmeter. In such flowmeters, an optical cable is held between microbend jaws. One of the jaws is connected to a sensor beam which is exposed to a flow of fluid that has fluid vortices therein. The frequency of the fluid vortex is a measure of the flow rate for the fluid. Each time a vortex passes, the sensor beam is moved. This movement is transferred to the microbend jaws which then bend the optical cable or fiber. In this way light which is passing through the optical cable is modulated thus giving a signal corresponding to the passage of the vortex.

Vortex shedding flowmeters using a light barrier which comprises a light source and a spaced apart light detector, is known for example from U.S. Pat. Nos. 4,519,259 to Pitt et al. 4,270,391 to Herzl discloses an electronic arrangement for processing signals from a vortex shedding flowmeter.

For any sensor, voltage and/or current signals from the sensor must either be compatible with circuitry for interpreting the signal, or be converted into signals which are compatible.

One industrially accepted transmission path for conveying signals from a sensor or transducer to interpreting circuitry is a two-wire analog transmission system.

Two-wire analog transmission systems are well known. Such systems include a transmitter which is connected to a power supply by two wires which form a current loop. The transmitter includes, as at least one of its features, a transducer or sensor which senses a process variable such as flow rate, pressure or temperature.

The power supply is connected to the two wires to close the current loop. It is also conventional to provide a resistor in the current loop. The transmitter amplifies the signal from its transducer and this amplified signal is used to draw a certain current from the power supply which is proportional or otherwise related to the process variable. It is conventional to draw from a minimum of 4 mA to a maximum of 20 mA. The current between 4 and 20 mA passes through the resistor to produce a voltage drop across the resistor. This voltage drop can be measured to give a value for the process variable.

The electronics for a two-wire, 4–20 mA industrial control transmitter, however, has only about 3.5 mA and 10 volts with which to operate. Fiber optic systems presently require several mA for the light emiter, often 200 mA or greater and as such as are not compatible with two-wire, 4–20 mA transmitters.

Although the current drawn by the transmitter goes up above the 4 mA minimum as the process variable being measured changes, present transmitters only use the 4 mA to operate their circuitry and sensor. An additional 16 mA is available at the upper end of the signal range if the circuitry is capable of utilizing it.

SUMMARY OF THE INVENTION

Pulse mode, or low-duty-cycle operation is necessary to utilize a fiber optic sensor in a 4–20 mA transmitter. The present invention gives a method to achieve such low-duty-cycle operation and the associated techniques to make it suitable for use in a two-wire 4–20 mA vortex shedding flowmeter transmitter.

The maximum pulse frequency, for a given pulse width, is limited by the power available. Reducing the pulse width decreases the power needed, but speed of available circuits, with the capability of low-power operation, limits the minimum pulse width. The bandwidth for this transmitter is limited as signal frequencies are restricted to less than half of the pulse (or sample) frequency to prevent aliasing or frequency foldover about the sampling frequency.

The system is operated with a fixed pulse rate and circuit current which is limited to 4 mA.

A sensor, typically but not exclusively a microbend fiber optic unit, providing variable light attenuation controlled by the process variable being measured, may be used. A microbend sensor modulates the received light by only a small amount (on the order of 2% maximum) in a vortex shedding flowmeter application. The electronics must make this small change into a full-scale output. This is accomplished by bucking the signal from the light detector and amplifying it. The bucking is controlled by a feedback circuit so that the average height of the peaks of the pulsed light signal are controlled to a fixed level. This control has a long time-constant so that rapid changes in the signal, the vortex shedding frequencies, are passed. These frequencies are demodulated from the pulse signals by sample and hold circuits and used to control the 4–20 mA output.

Power is gated to the preamp circuit in order to save power. A preamp of the invention uses a programmable current opamp. High current operation is necessary to amplify the fast pulses from the fiber optics. However, the low current mode is adequate during the off period of the sampling. Gating the current to the preamp in conjunction with the optic system pulse results in a significant power savings.

Accordingly an object of the invention is to provide a method and circuit for generating and processing signals of an optic fiber which produces output signals compatible with a two-wire 4–20 mA arrangement.

Another object of the invention is to provide such a method and circuit wherein low flow rates can be measured in a linear fashion by using a multivibrator which is capable of linearizing signal from the optical system at low flow rates for the meter.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a graph showing the current waveform of the light emitting diode of the circuit in FIG. 1;

FIG. 3 is a graph showing the voltage waveform from a peak-following sample and hold portion of the circuit in FIG. 1;

FIG. 4 is a graph showing the waveform at the output of a second sample and hold portion of the circuit of FIG. 1;

FIG. 5 is a graph showing a signal from the detector which has a portion enlarged to show positive and negative saturation points as well as an average clamped level for a preamp which is used to amplify the signal from the detector.

DESCRIPTION OF THE PREFERRED EMBODIMENT

Figure 1A:
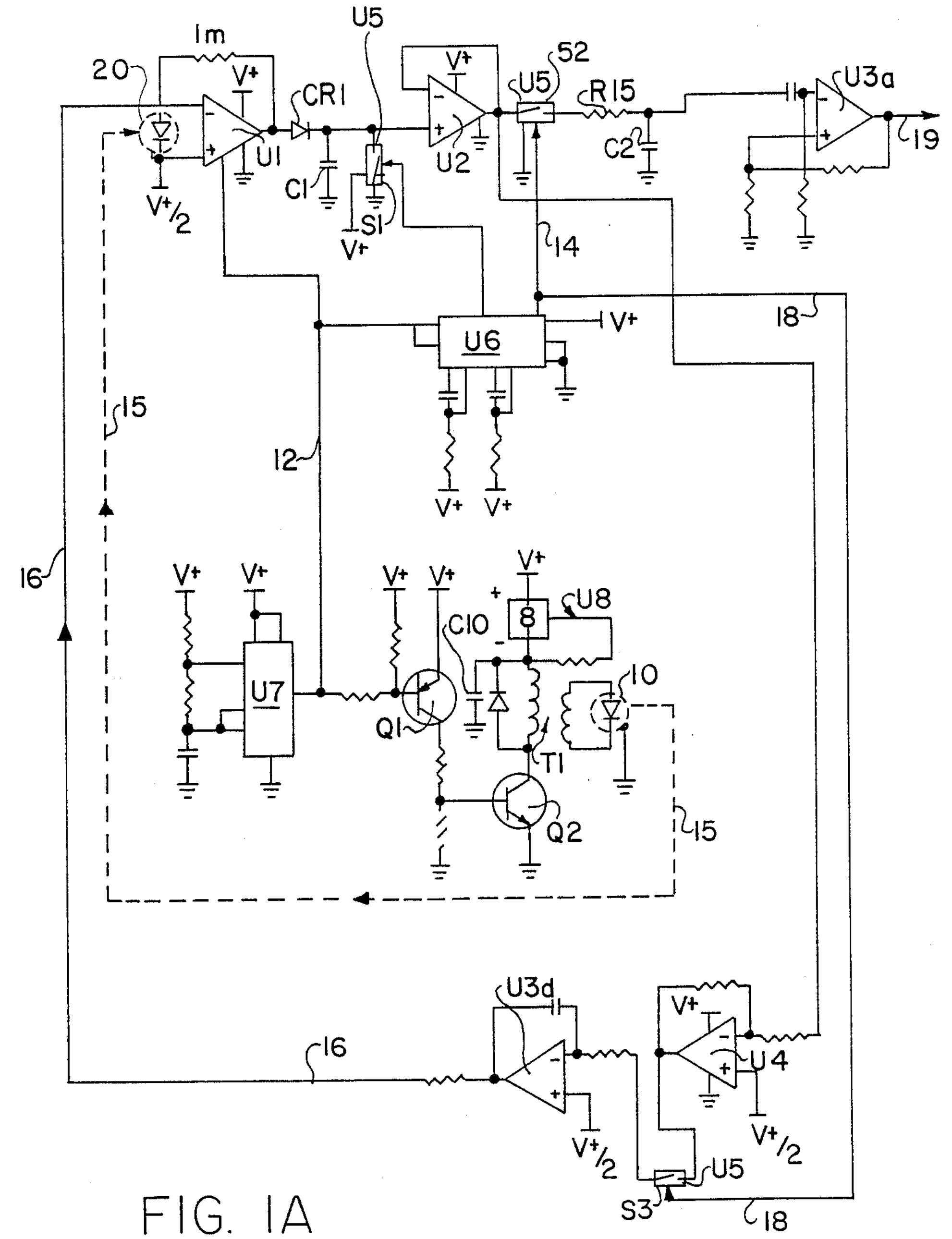
FIG. 1A is part of a circuit for converting an optical signal into a current signal which is appropriate for a two-wire 4–20 mA system in accordance with the present invention.

Referring to the drawings in particular, the invention embodied therein is a method and circuit for processing an optical signal from the microbend fiber optics of a vortex shedding flowmeter which can measure the frequency of vortices being shed by the flow of fluid past a bluff.

The vortex shedding frequencies produced at the lower flow rates of the meter's range are nonlinear due to the mechanical properties of the meter (mainly its Stouhal vs. Reynolds number characteristics). To compensate for this, a circuit which adjusts the analog current output such that it is linear for these flows has been provided. Also, the zero and span adjustments have been expanded to allow a wider range of adjustability and to provide the least amount of interaction between the two adjustments.

Figure 1B:
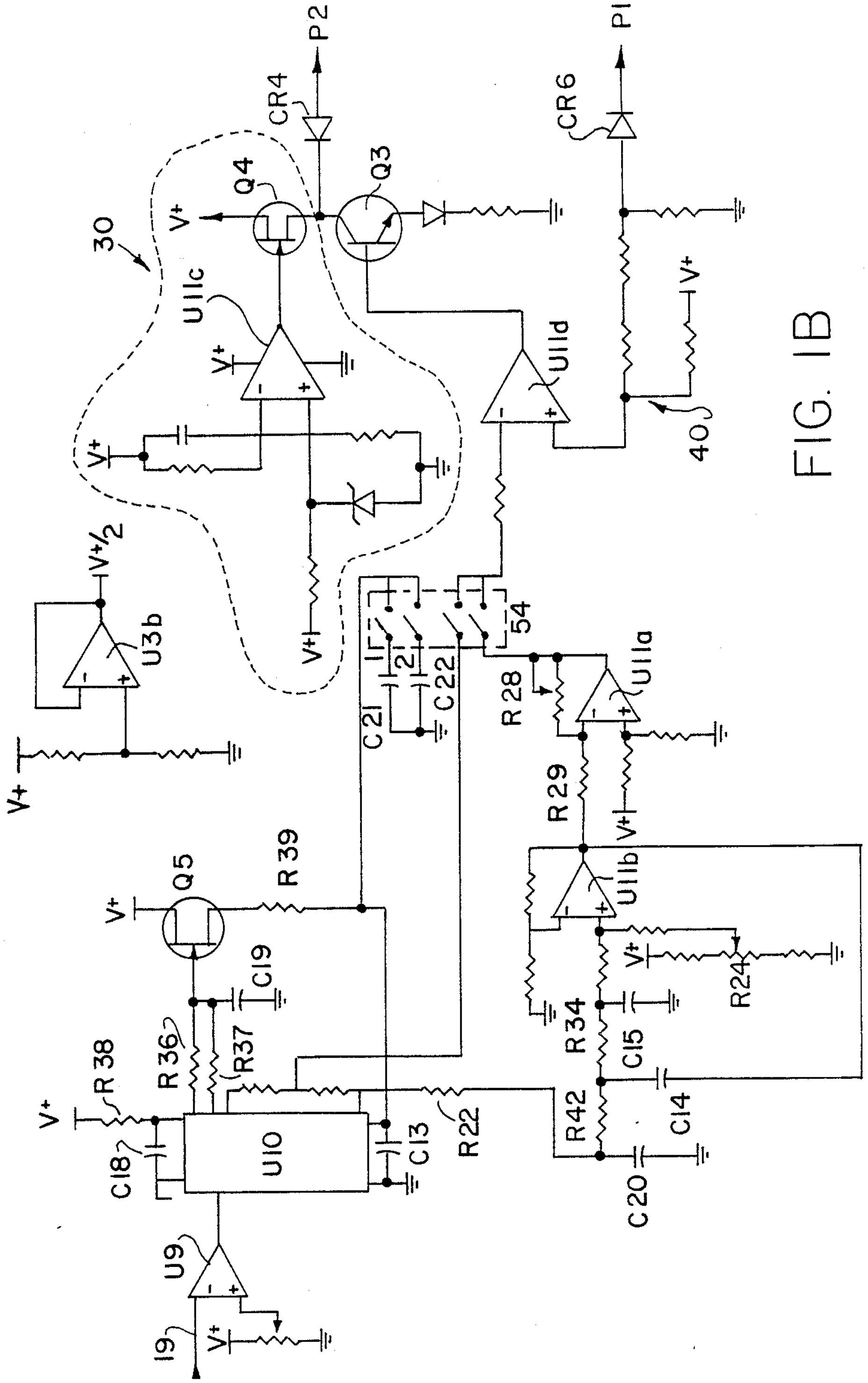
FIG. 1B shows the remainder of the circuit of FIG. 1A along with a separately shown power supply which is used for supplying voltage to various points of the circuit.

FIGS. 1A and 1B together form a schematic diagram of electronics suitable for a readout of a fiber optic microbend sensor as used in a vortex shedding flowmeter and in accordance with this invention.

Current to the LED 10 (Light Emitting Diode) is supplied as a series of pulses, typically having a duty cycle of 1 to 2%, an amplitude of 200 mA and a repetition rate or frequency of 500 to 5000 Hz. Oscillator U7, shown in FIG. 1A and typically a low-power CMOS version of a 555 timer such as a 7555, is used to generate the control signal for the LED current. Transistors Q1 and Q2 amplify the oscillator's output. Transformer T1 serves to match the drive requirements of 1.5 Volts of the LED to the circuit's higher drive voltage of typically 6 to 10 Volts. This transformer is typically a pulse transformer with a 4:1 turns ratio. Current regulator U8 and capacitor C10, serve to isolate the high pulses of current from creating voltage pulses on the power supply 30 for the rest of the transmitter circuit by limiting the peak current to around 1 mA and storing charge in the capacitor C10 between the LED pulses. Part of the power supply is shown at 30 in FIG. 1B. Then the LED current primarily comes from the charge stored in the capacitor C10. FIG. 2 shows the current waveform to the LED 10.

The light pulses of LED 10 are transmitted to the light detector 20 by a fiber optic cable 15. Varying attenuation is effected typically by application of bending to the fiber or the changing of coupling at a discontinuity in the fiber. The light detector 20 converts the received light into an electrical sensor signal, typically a current. The detector 20 supplies a current to the following circuit:

A preamp U1 converts the detector current pulses into voltage pulses. The integrated circuit used as U1 must be capable of low power operation and have sufficient bandwidth to faithfully amplify the pulses. A type TLC271 from Texas Instruments is a programmable CMOS opamp which meets these requirements. In the low-current mode it meets the power requirements. The high-current mode has the bandwidth necessary for amplifying the pulses. The amplifier is switched into the high power and high bandwidth mode only when the pulse is present. This is controlled by the drive signal to the LED 10 which is supplied to preamp U1 over line 12. Thus preamp U1 is not drawing high power during periods when such is not necessary to the circuit's operation.

A peak-following sample and hold function is performed by the combination of C1, CR1, and S1 (which is part of electronic switch U5). Switch S1 discharges the voltage on capacitor C1 at the beginning of the light pulse. Switch S1 is controlled by a one-shot multivibrator circuit in U6 (MC14538 or MC14528) which is triggered over line 12 by the beginning of the pulse to the LED. Then C1 charges through diode CR1 from the output of the preamp. C1 stops charging at the peak of the preamp output and the diode prevents the immediate discharge necessary to follow the downside of the pulse. FIG. 3 shows this operation. Opamp U2 buffers the voltage on C1, allowing the following circuitry to operate without affecting the signal on C1.

A second sample and hold is performed by switch S2, resistor R15, and capacitor C2. Switch S2 is closed by a signal on line 14 from U6 after the LED pulse has finished. The peak of the pulse as stored on capacitor C1 is sampled and stored on capacitor C2. The resistor R15 and capacitor C2 perform a low-pass filtering action to reduce the sampling frequency (LED pulse frequency) component from the signal received from the optical system. FIG. 4 shows the output of this circuit.

Opamps U4 and U3d form a feedback control loop. This loop compares the peaks of the pulses from the opamp U2 with signal ground and returns a current to the preamp U1 input over line 16 to drive the peaks back to ground. This is necessary since the pulses are quite large, sufficient to drive the preamp into saturation. FIG. 5 shows this signal and the typically 2% maximum modulation. The effect of this circuit on the signal is shown also. U3d is an integrator (or low pass filter) so that the adjustment effect is slow acting. Thus long term variations are removed and signal components are not affected. Switch S3 controls the operation of this loop over line 18 so that it only operates immediately following the end of the pulse to the LED. This removes any influence from decay on capacitor C1's voltage between signal pulses.

Turning now to FIG. 1B, the internal power supply 30 is regulated by amp U11c and its associated components, including Q4, a series pass field effect transistor (FET). Opamp U3b divides the internal power supply, typically 10 Volts, into two 5 Volt supplies V+/2 with signal ground in the middle. This allows for operation of amplifiers that have voltage swings above and below signal ground (see FIG. 5).

The typically low level sine wave signal from the second sample and hold (S2,R15,C2) is gained up by U3a in FIG. 1A and is operated on by a level detector U9, which receives the signal over line 19 and converts it to a rectangular or square wave. This rectangular or square wave is used to trigger a one-shot multivibrator U10, to give a fixed length, fixed amplitude pulse for each cycle of the sine wave signal from the optical system. The multivibrator also performs the linearization of the signal from the optical system at low flow rates of the meter.

Typically, the lower 5% to 6% of the flow rate for vortex shedding flowmeters (1 ft/sec to 2 ft/sec) is nonlinear. As an example, the frequencies generated in that region for water flowing in a 2 inch meter could be between 6 Hz and 12 Hz. The first multivibrator in U10 has a setpoint frequency which is determined by an external timing resistor R38, and an external timing capacitor C18. By sizing R38 and C18 properly, the setpoint frequency could be made to be 12 Hz. When the vortex shedding frequency is below 12 Hz, the outputs of the first multivibrator are averaged together by resistors R36 and R37 and capacitor C19 and this voltage is used to bias transistor Q5 (which is an FET) on. The drain of Q5 is connected to external timing components R39 and C13, of the second multivibrator in U10.

Figure 6:
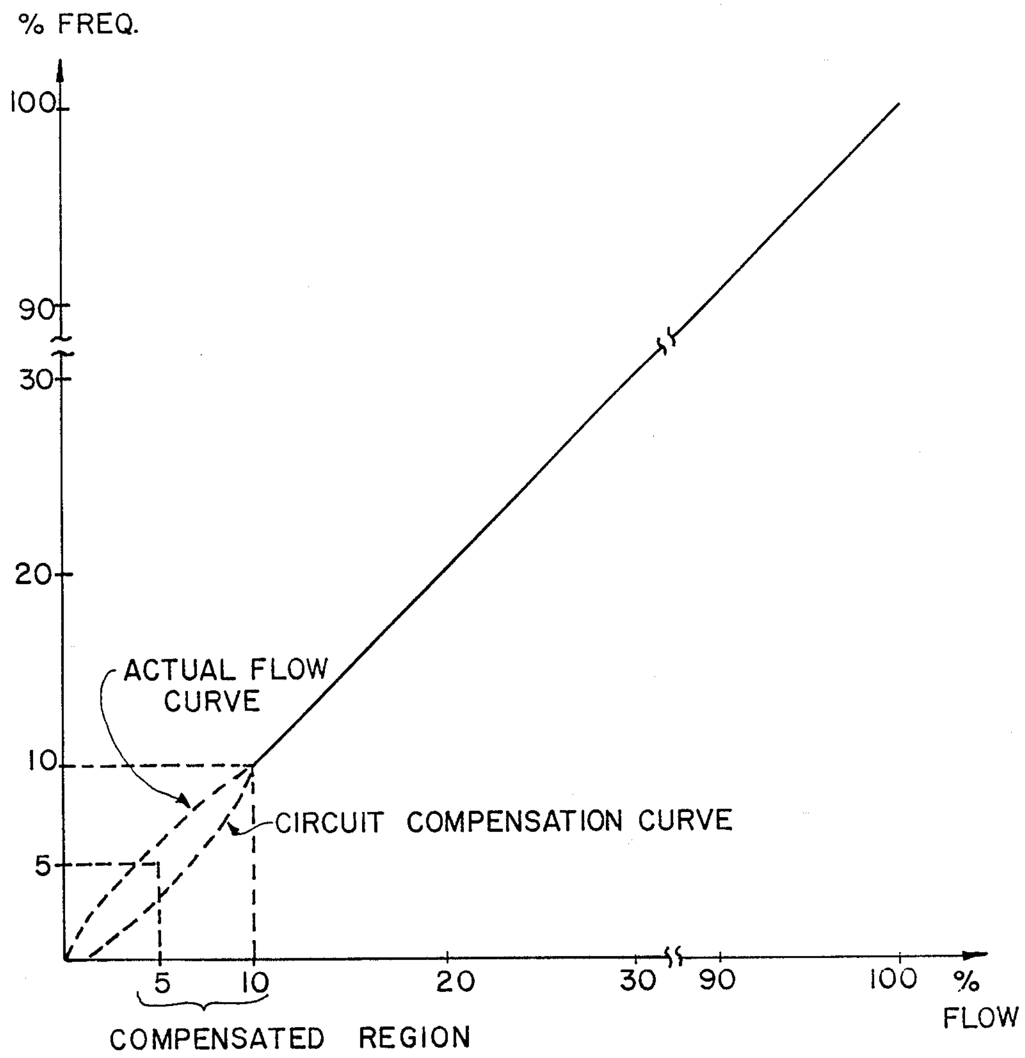
FIG. 6 is a graph relating percent flow through the flowmeter to percent of a maximum variable frequency corresponding to the flow rate.

As the frequency varies up to the setpoint frequency of 12 Hz, the averaged voltage applied to the gate of Q5 causes it is turn on less. See FIG. 6 for a graphical representation of the curve produced. By regulating how much Q5 is turned on, the voltage applied to the external timing components of second multivibrator causes it to produce an output whose fixed pulse length changes as this voltage changes. When the frequency rises above the setpoint frequency, the first multivibrator stops pulsing and a constant averaged voltage is applied to the gate of Q5. This results in a constant voltage being present at the external timing components of the second multivibrator which in turn allows the fixed pulse length of its output to remain constant (i.e. linear output).

This pulsed output from the multivibrator U10 is averaged by the network which includes resistors R22, R42, R34 and capacitors C20, C14, and C15. The averaged voltage then is inputted to a zero adjustment amplifier U11b. Potentiometer R24 provides a voltage which is added to the averaged pulsed output to provide the appropriate voltage which corresponds to 0% or 4 mA. This output is then inputted to a span adjustment amplifier U11a which applies an adjustable gain (via potentiometer R28) to allow the proper 100% or 20 mA signal to be generated.

An additional portion of the span adjustment includes capacitors C21 and C22 which can be placed in parallel with the external timing capacitor C13 by using dip switches S4-1 and S4-2. By increasing the capacitance in the external timing circuit, the fixed pulse length of the pulsed output can be varied so that the adjustability of the span adjustment's gain can be simplified to just the resistor R29 and the potentiometer R28. As an example, the circuit can be set up such that the following holds true: When C13 is in the external timing circuit by itself, the gain of the span adjustment could be set for a 100% output for frequencies anywhere between 250 Hz and 2500 Hz. For C21 in parallel with C13, the adjustment may provide 100% output for frequencies between 25 Hz and 250 Hz. Finally, when C22 is in parallel with C13, the frequencies for which 100% output could be generated are 2.5 Hz and 25 Hz.

The output of the span adjustment controls a voltage-to-current section 40 which produces the 4 to 20 mA output signal of the transmitter. This circuit includes U11d, Q3 adn its associated resistors. The two-line 4–20 mA output is available at terminals P1 and P2.

The invention thus provides a method of utilizing a fiber optic readout using a microbend or other sensor of similar characteristics, such as a readout for a vortex shedding flowmeter, that operates in a two-wire 4–20 mA format. It overcomes the power requirement restrictions in the application of present fiber optic techniques to such a transmitter. It also provides linearization of the analog current output for the lower flow rates of the vortex shedding flowmeters.

While a specific embodiment of the invention has been shown and described in detail to illustrate the application of the principles of the invention, it will be understood that the invention may be embodied otherwise without departing from such principles.

What is claimed is:

1. A method of processing an optically generated signal to form a two-wire current signal comprising:

generating a control signal having pulses at a selected frequency;

generating current pulses using the control signal and applying them to a light emitter to generate light pulses;

transmitting the light pulses over a transmission line to a light detector to generate a sensor signal, attenuation in the transmission line being varied according to a process variable to modulate the sensor signal.

amplifying the sensor signal using an operational amplifier which is switchable between low and high current modes, the high current mode having a wide bandwidth, the operational amplifier forming an amplified signal having peaks;

switching the operational amplifier to its high current mode only during pulses of said control signal to amplify the sensor signal, the operational amplifier being switched to its low current mode at other times;

sampling and holding the peaks of the amplified signal to form a cyclic peak following signal having a frequency component of the selected frequency;

low-pass filtering the peak following signal to form a cyclic filtered signal which has reduced amplitudes of signals at the selected frequency;

triggering a multivibrator using the filtered signal to form a pulse signal having pulses which are fixed in length and voltage amplitude for each cycle of the filtered signal;

averaging the voltage amplitudes of the pulses in the pulse signal to produce an average voltage signal;

converting the average voltage signal into a two-wire current signal; and wherein the process variable comprises a pulsing process variable signal having low frequency pulses for low process variable and high frequency pulses for high process variable, the relationship between the frequency of the plurality of pulses and the process variable being nonlinear for low frequency pulses of the process variable signal, the method including establishing a setpoint frequency for the multi-vibrator above which the relationship between the process variable and the frequency of the process variable signal is substantially linear, averaging the voltage of the pulse signal in a non-linear manner for process variable signals having a frequency below the setpoint to linearize the relationship between process variable and the average voltage below the setpoint frequency, and averaging the voltage of the pulse signal in a linear manner for frequencies of the process variable above the setpoint frequency.

2. A method according to claim 1, including generating a feedback slow changing signal which corresponds to a difference between peaks of the amplified signal and a ground potential, changes in the feedback signal being slow with respect to the selected frequency, and applying the feedback signal to the operational amplifier to drive the operational amplifier toward the ground potential.

3. A method according to claim 2, including applying the clamping signal to the operational amplifier following the end of each pulse of the control signal.

4. A method according to claim 1, including zero adjusting the average voltage signal to produce a 4 mA current signal at 0% flow of the process variable.

5. A method according to claim 4, including span adjusting the average voltage signal to form a 20 mA current signal at 100% flow of the process variable.

6. A method according to claim 5, including generating a feedback slow changing clamping signal which corresponds to a difference betrween peaks of the amplified signal and a ground potential, changes in said feedback slow changing signal being slow with respect to the selected frequency, and applying the clamping signal to the operational amplifier to drive the operational amplifier toward the ground potential.

7. A method according to claim 6, including applying the clamping signal to the operational amplifier following the end of each pulse of the control signal.

8. An apparatus for processing an optically generated signal to form a two-wire current signal comprising:

an oscillator for generating a control signal having pulses at a selected frequency;

a current source connected to said oscillator for producing current pulses in response to said control signal;

a light emitter connected to said current source for receiving said current pulses and carrying light pulses in response thereto;

a light transmission line connected to said light emitter for carrying said light pulses, said current line having an attenuation which varies in response to a process variable;

a light detector connected to said transmission line for generating a sensor signal which is modulated according to the process variable and according to the selected frequency of the control signal;

amplifying means connected to said light detector for amplifying said sensor signal, said amplifying means being switchable between a low current mode of operation and a high current mode of operation, said high current mode of operation having a wide bandwidth, said amplifier means being connected to said oscillator and being switched into its high current mode only during pulses of said control signal fo amplifying said sensor signal;

peak-following sample and hold means connected to said amplifying means for generating a cyclic peak-following signal having a frequency component of the selected frequency;

low-pass filter means connected to said peak-following sample and hold means for filtering out said frequency component of the selected frequency from the cyclic peak-following signal to form a filtered signal;

feedback means connected between said peak-following sample and hold means and said amplifying means for generating a slow changing signal corresponding to a difference between a ground potential and peaks of the amplified sensor signal to drive said amplifier means toward said ground potential;

a multivibrator connected to said low-pass filter means for generating a pulse signal having fixed length and voltage amplitude pulses for each cycle of said filtered signal;

voltage averaging means connected to said multivibrator for voltage averaging said pulse signal;

voltage to current conversion means connected to said voltage averaging means for converting the average voltage signal into a two-wire current signal;

and zero adjustment means connected between said voltage averaging means and said voltage to current conversion means for adjusting said average voltage signal so that said conversion means generates a current signal of 4 mA for the process variable at a flow other than 0%.

9. An apparatus according to claim 8, including pulse-end signal means connected to said oscillator for receiving said control signal and for generating pulse-end signals at the end of each pulse of said control signal, said pulse-end signal means being connected to said feedback means for gating and feeding back said slow changing signal only at the end of each pulse of said control signal.

10. An apparatus according to claim 9, wherein said pulse-end signal means is connected to said low-pass filter means for generating said peak-following signal only at the end of each pulse of said control signal.

11. An apparatus according to claim 10, wherein said amplifying means comprises a preamp having one input for receiving said slow changing signal and another input for receiving said sensor signal, a diode connected to an output of said opamp, and a first capacitor connected to an output of said diode for carrying a charge corresponding to peaks of the sensor signal.

12. An apparatus according to claim 11 including span adjustment means connected between said zero adjustment means and said voltage to current conversion means for adjusting said average voltage signal of 20 mA at 100% of the process variable.

13. An apparatus according to claim 12, including a first external timing circuit connected to said multivibrator for generating pulse signals below a setpoint frequency and a second external timing circuit connected to said multivibrator for generating pulse signals above said setpoint frequency.

* * * * *